W. E. ROSEBUSH.
COMPOSITE AUTOMATIC FIREARM.
APPLICATION FILED JAN. 26, 1920.

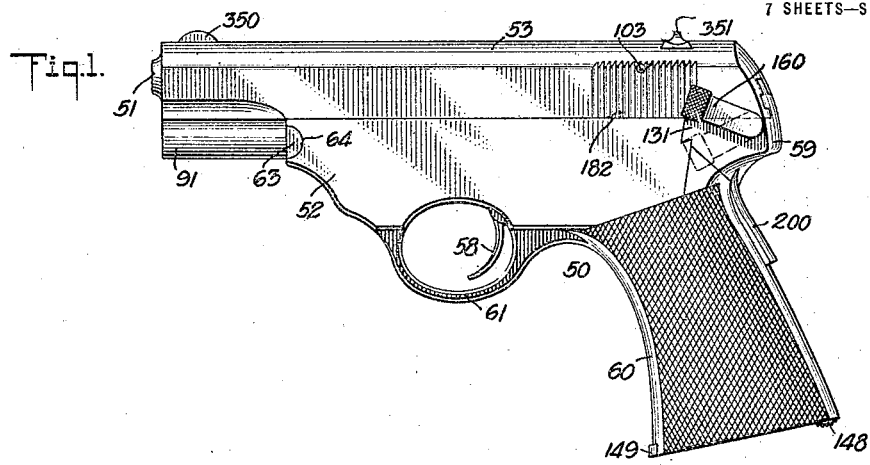
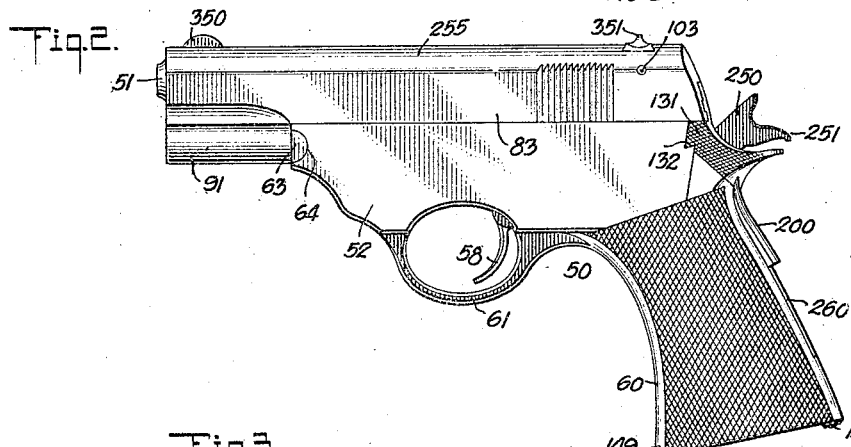
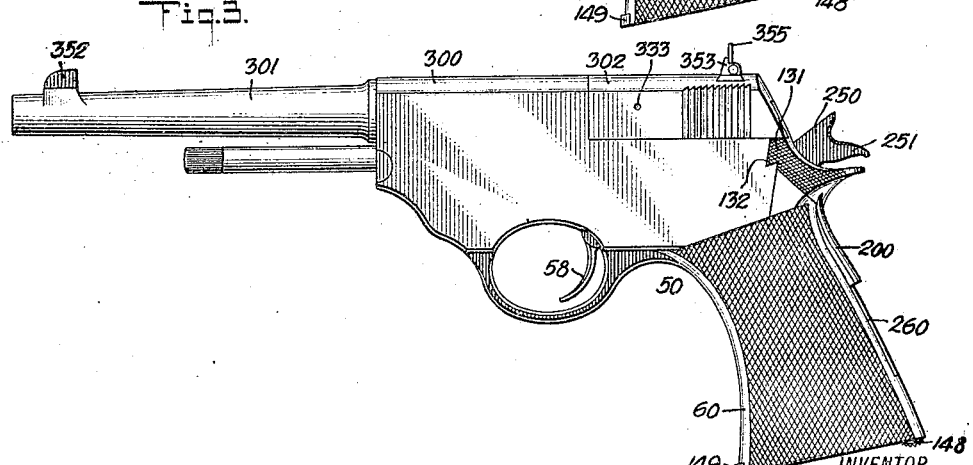

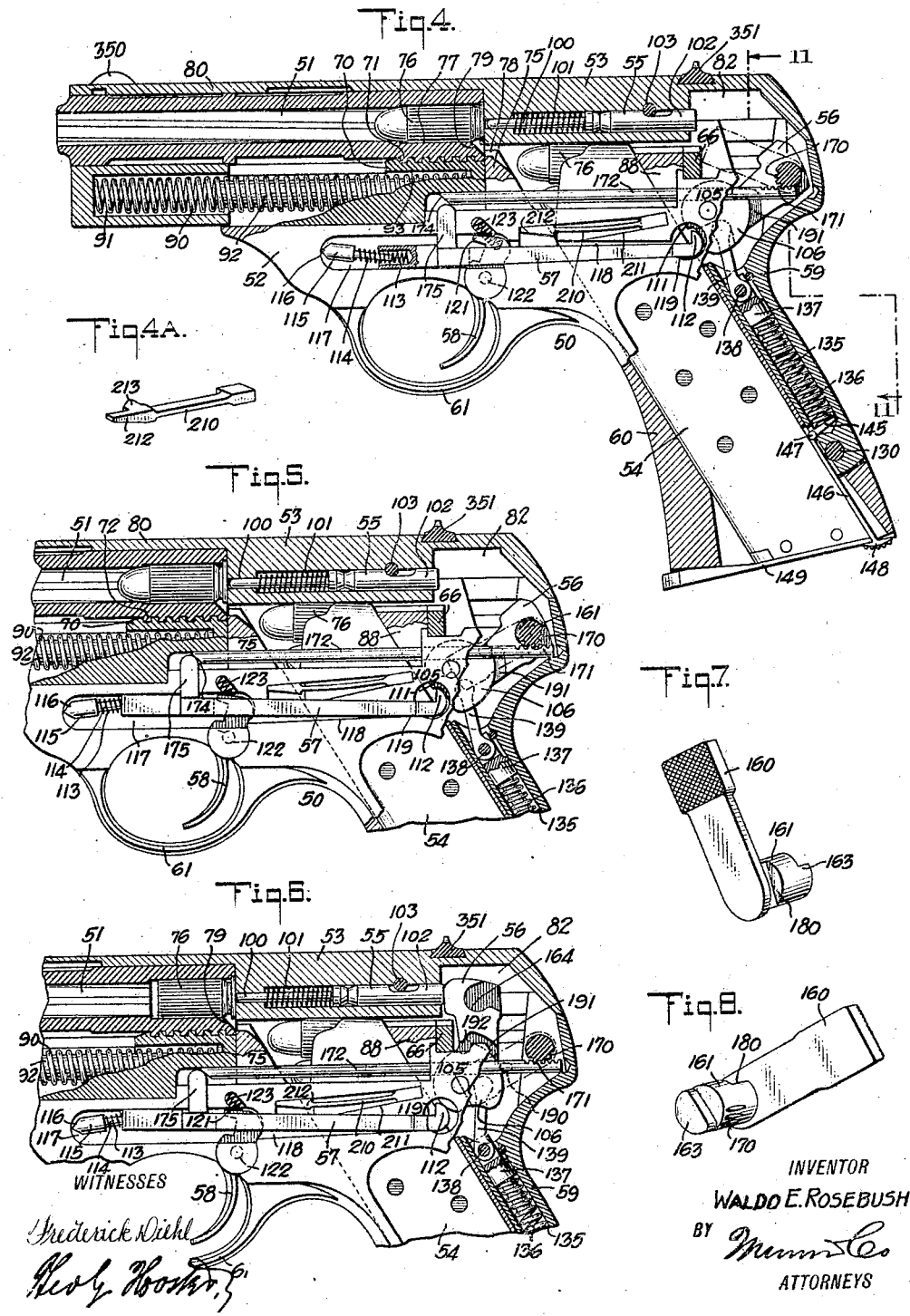

1,377,629.

Patented May 10, 1921.
7 SHEETS—SHEET 3.

WITNESSES
Frederick Diehl.

INVENTOR
WALDO E. ROSEBUSH
BY
ATTORNEYS

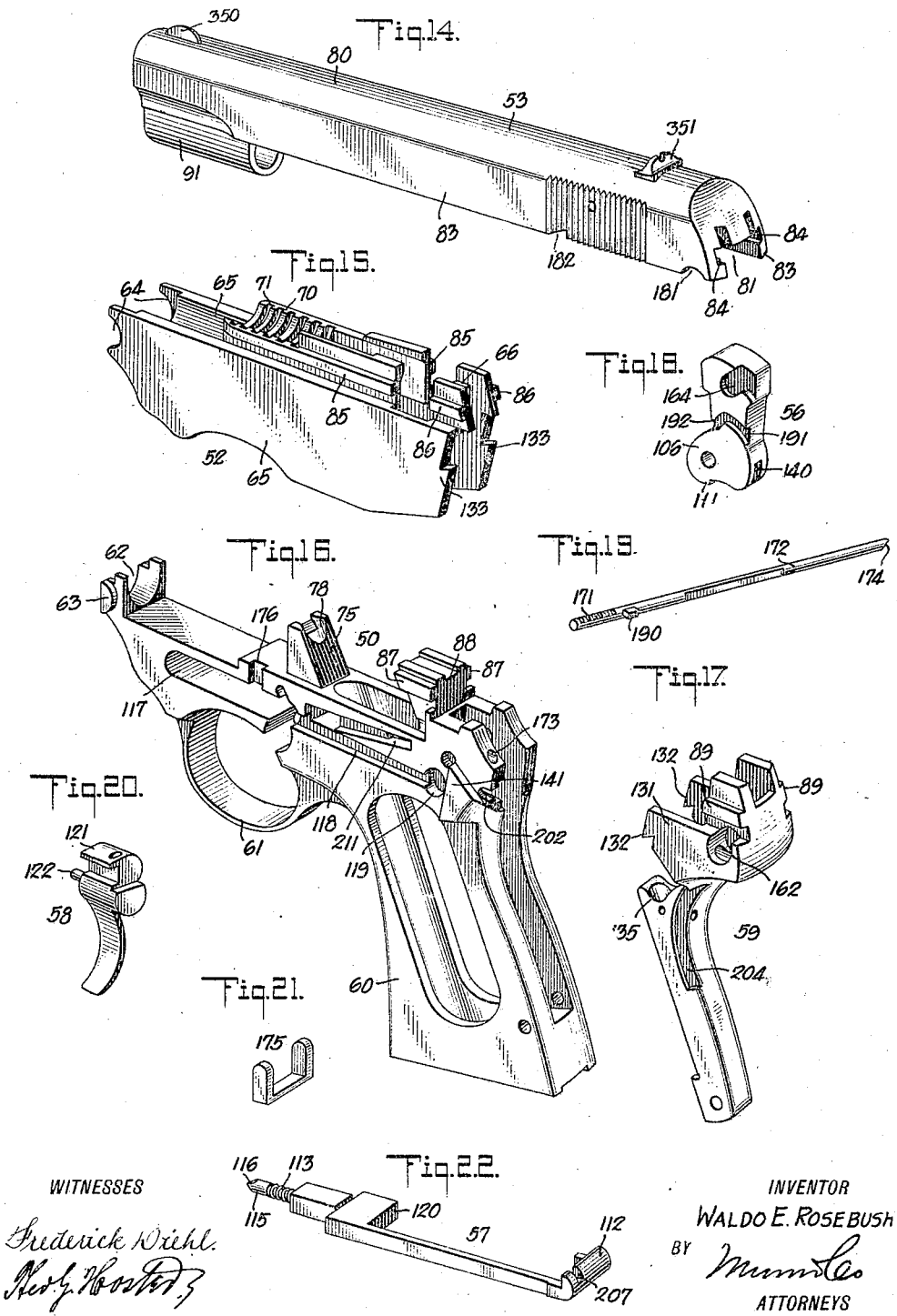

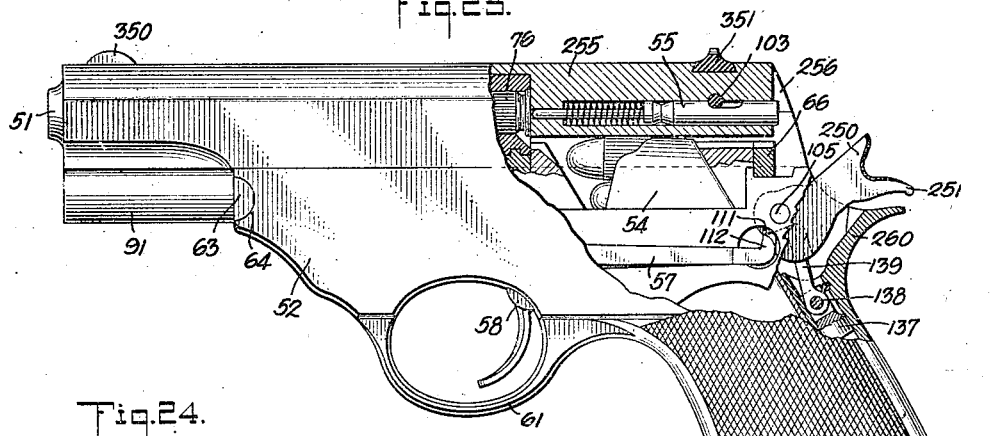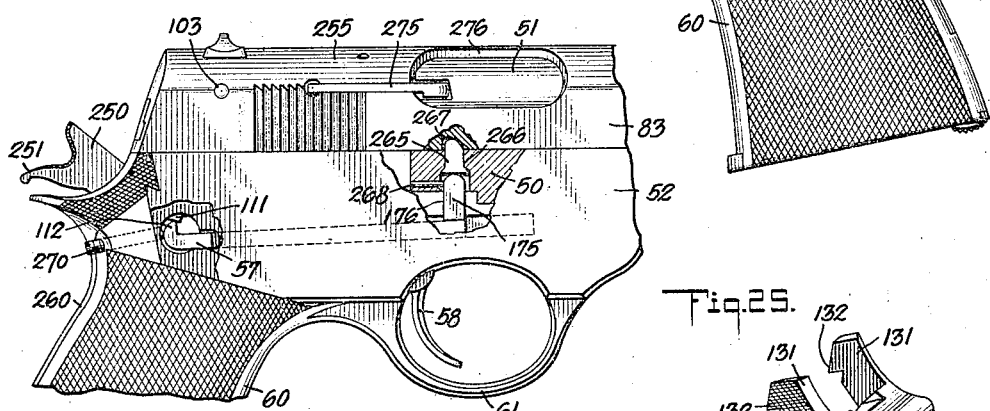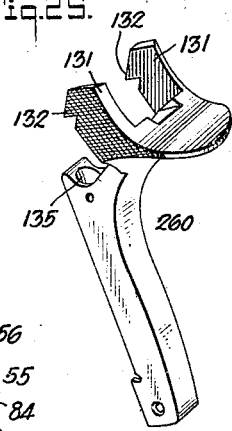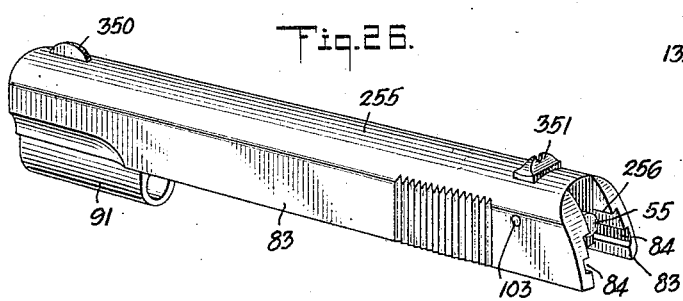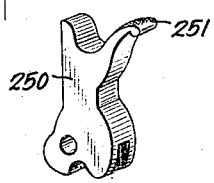

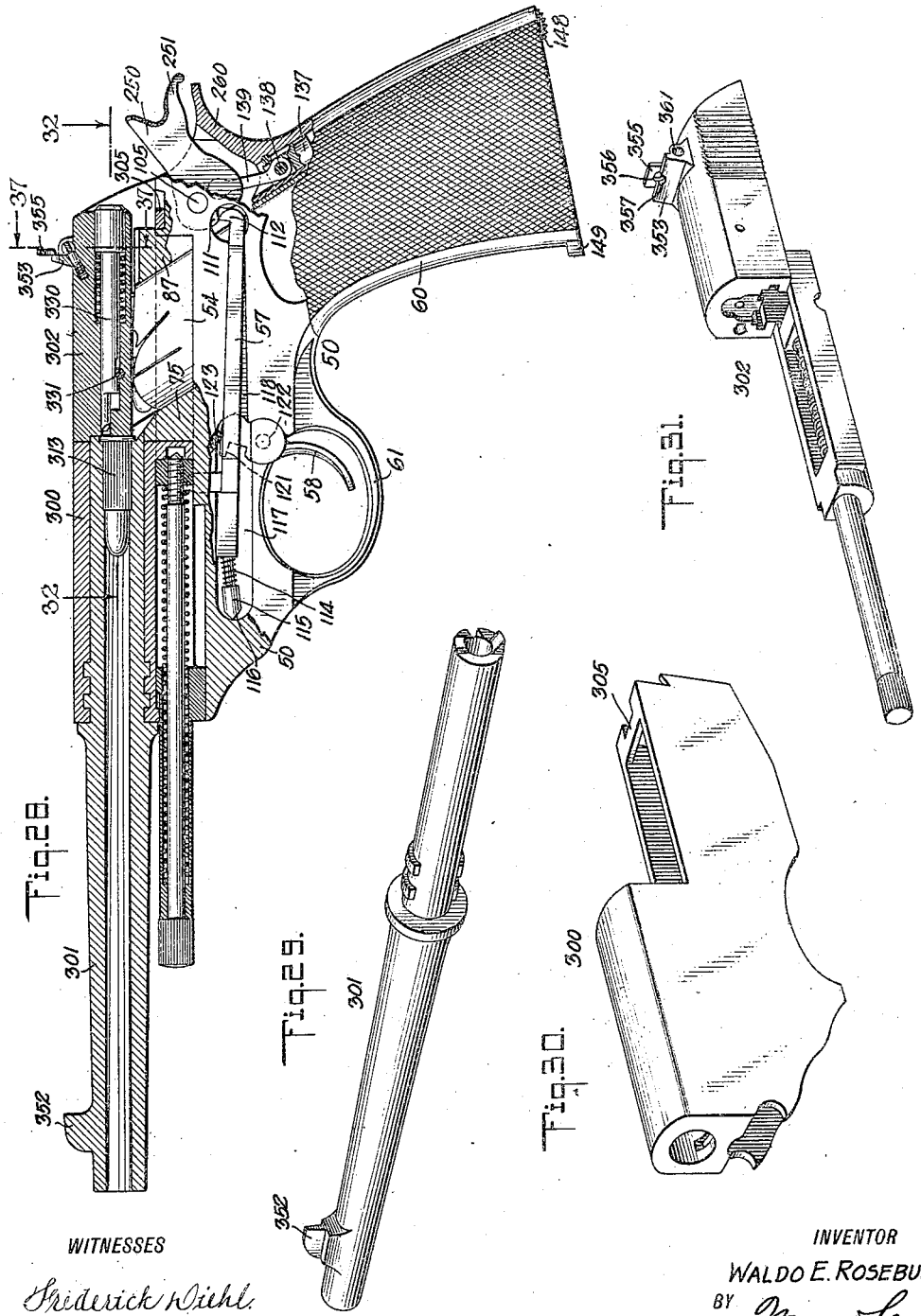

W. E. ROSEBUSH.
COMPOSITE AUTOMATIC FIREARM.
APPLICATION FILED JAN. 26, 1920.
1,377,629.
Patented May 10, 1921.
7 SHEETS—SHEET 7.
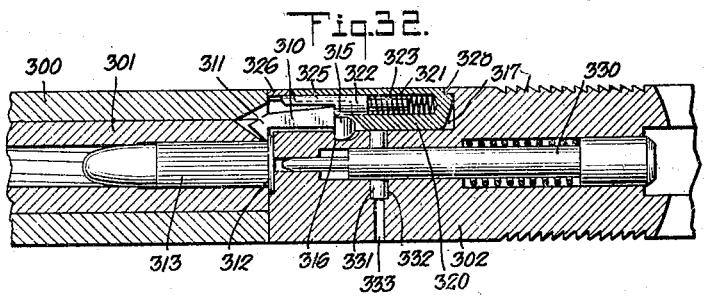
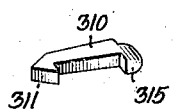
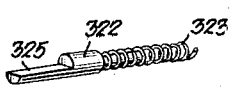
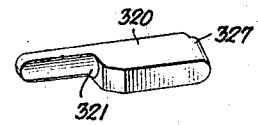
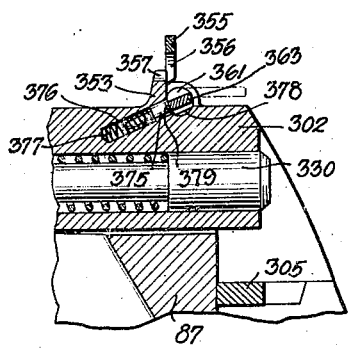
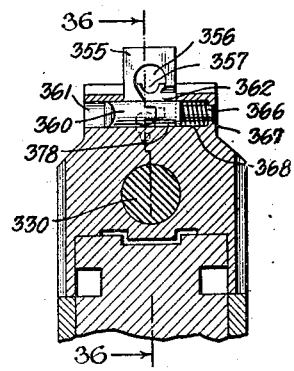
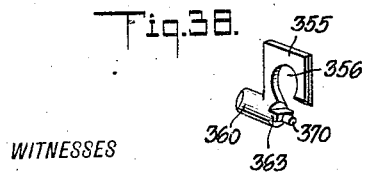
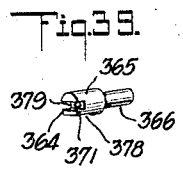
WITNESSES
INVENTOR
WALDO E. ROSEBUSH
BY
ATTORNEYS

UNITED STATES PATENT OFFICE.

WALDO E. ROSEBUSH, OF SPOKANE, WASHINGTON.

COMPOSITE AUTOMATIC FIREARM.

1,377,629.  Specification of Letters Patent.  Patented May 10, 1921.

Application filed January 26, 1920. Serial No. 353,983.

*To all whom it may concern:*

Be it known that I, WALDO E. ROSEBUSH, a citizen of the United States, and a resident of Spokane, in the county of Spokane and State of Washington, have invented a new and Improved Composite Automatic Firearm, of which the following is a full, clear, and exact description.

The invention relates to recoil-operated, breech-loading hand firearms, such, for instance, as shown and described in the Letters Patent of the United States, No. 1,291,688 and No. 1,311,715, granted to me on January 14, 1919, and July 29, 1919, respectively.

The object of the present invention is to provide a new and improved composite automatic hand firearm which can be readily changed for use in target practice or for service by the use of comparatively inexpensive interchangeable parts to accommodate the various cartridges of the hand firearm type and which are of various caliber, length and power.

Another object is to provide a composite firearm of either the hammer or hammerless type.

Another object is to compensate for the varying recoil incident to the use of cartridges of different caliber, length and power.

Another object is to provide a composite automatic hand firearm which is less expensive and takes up less room and is easier carried about than a series of firearms capable of firing cartridges of different caliber and length and covering the same range as the improved composite firearm.

Another object is to render the composite firearm exceedingly serviceable for military use by providing a single firearm which can be used for target practice and readily changed for service.

With these and other objects in view, the invention consists of certain novel features of construction, as hereinafter shown and described and then specifically pointed out in the claims.

A practical embodiment of the invention is represented in the accompanying drawings forming a part of this specification, in which similar characters of reference indicate corresponding parts in all the views.

Figure 1 is a side elevation of the improved firearm arranged as a hammerless of 32-caliber;

Fig. 2 is a similar view of the improved firearm arranged as hammer controlled;

Fig. 3 is a similar view of the improved firearm arranged as a 22-caliber hammer controlled, and provided with a barrel for target practice;

Fig. 4 is a longitudinal section of the improved firearm illustrated in Fig. 1, and with the safety in active position;

Figure 9:
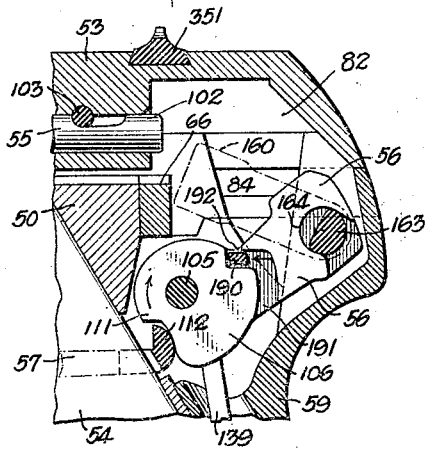
Figure 10:
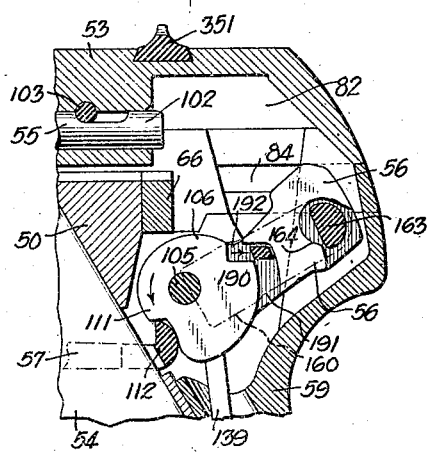
Figure 11:
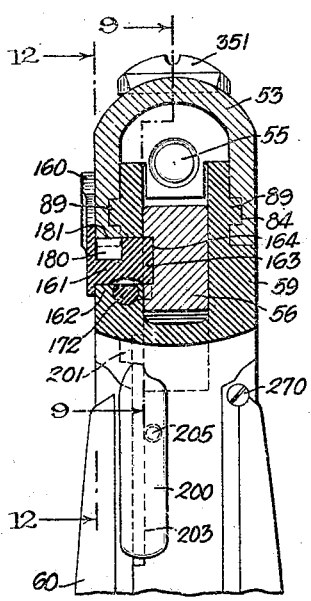
Figure 12:
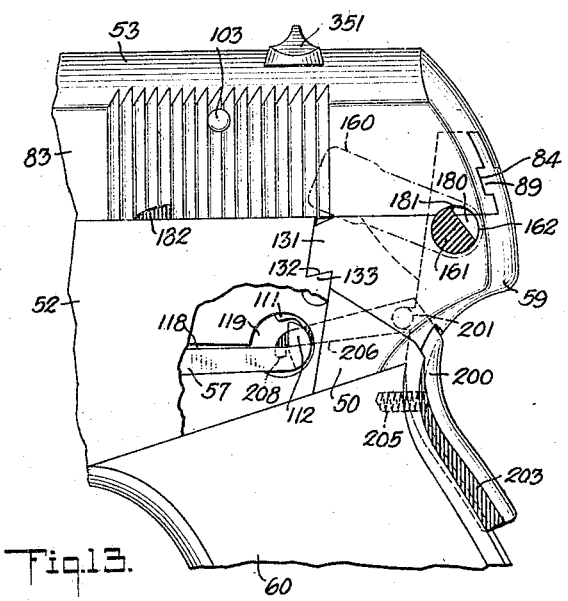
Figure 13:
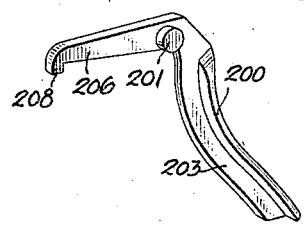

Fig. 4ª is a perspective view of the spring for moving the sear into inoperative position on withdrawing the magazine;

Fig. 5 is a fragmentary view of the improved firearm shown in Fig. 1 and with the safety off and the parts in firing position;

Fig. 6 is a similar view of the same with the parts in position after firing, and with the breech block in position prior to its recoil;

Figs. 7 and 8 are perspective views of the safety lever;

Fig. 9 is an enlarged fragmentary view of the safety device with the parts in active position, the section being on the line 9—9 of Fig. 11;

Fig. 10 is a similar view of the same with the parts in inactive position;

Fig. 11 is an enlarged cross section of the improved firearm on the line 11—11 of Fig. 4;

Fig. 12 is an enlarged side elevation of the rear end of the firearm with parts in section, on the line 12—12 of Fig. 11;

Fig. 13 is a perspective view of the grip safety lever;

Fig. 14 is a perspective view of the breech block or bolt used in the firearm shown in Fig. 1;

Fig. 15 is a perspective view of the receiver used in the firearm shown in Figs. 1 and 2;

Fig. 16 is a perspective view of the main frame of the firearm;

Fig. 17 is a perspective view of the back strap used in the firearm shown in Fig. 1;

Fig. 18 is a perspective view of the hammer used in the firearm shown in Fig. 1;

Fig. 19 is a perspective view of the controlling bar controlled by the safety and controlling the sear;

Fig. 20 is a perspective view of the trigger;

Fig. 21 is a perspective view of the U-piece controlling the sear;

Fig. 22 is a perspective view of the sear;

Fig. 23 is a side elevation, partly in section, of the improved firearm illustrated in Fig. 2;

Fig. 24 is a fragmentary rear side elevation of the same with parts in section;

Fig. 25 is a perspective view of the back strap used in the firearms illustrated in Figs. 2 and 3;

Fig. 26 is a perspective view of the breech block or bolt used in the firearm shown in Fig. 2;

Fig. 27 is a perspective view of the hammer used in the firearm shown in Figs. 2 and 3;

Fig. 28 is an enlarged sectional side elevation of the firearm illustrated in Fig. 3;

Fig. 29 is a perspective view of the barrel used in the firearm shown in Figs. 3 and 28;

Fig. 30 is a perspective view of the receiver for the firearm shown in Figs. 3 and 28;

Fig. 31 is a perspective view of the breech block or bolt for the firearm shown in Figs. 3 and 28;

Fig. 32 is an enlarged sectional plan of the firearm on the line 32—32 of Fig. 28;

Figs. 33, 34 and 35 are perspective views of the several parts forming the extractor;

Fig. 36 is a fragmentary view of the sight on the line 36—36 of Fig. 37;

Fig. 37 is an enlarged cross section of the same on the line 37—37 of Fig. 28;

Fig. 38 and 39 are perspective views of parts of the sight.

In the manufacture of automatic firearms the main frame and the actuating mechanism form the most expensive parts. With my improvements presently described in detail the same main frame and the actuating mechanism mounted thereon are used in conjunction with interchangeable barrels, barrel receivers, breech blocks and magazines thus forming a single, complete, inexpensive composite hand firearm which accommodates all the cartridges of the hand firearm types and dispenses with the use of a series of individual firearms, one for each type of cartridge. The composite hand firearm in its general construction, as illustrated in the drawings, comprises a main frame, an actuating mechanism permanently mounted in the main frame and having two interchangeable hammers, three breech blocks or bolts, two barrel receivers, two barrels, two back straps and two magazines, to allow of forming for service a 32 or 45-caliber hand firearm of the hammerless or the hammer type, or for target practice to form a 22-caliber hand firearm of the hammer type and long rifle barrel. Use is also made of a special safety device comprising an extra rack bar and a lever, and which safety device is used only in the hammerless type of the hand firearm.

The automatic hand firearm illustrated in Figs. 1 and 4 to 22, inclusive, consists essentially of a main frame 50, a barrel 51, a barrel receiver 52, a recoil-operated breech block or bolt 53, a magazine 54, a firing pin 55, a hammer 56, a sear 57, a trigger 58 and a back strap 59. The main frame 50 is provided with a suitable handle 60 made hollow and forming a guideway for the removable magazine 54, and the said frame 50 is further provided with the usual trigger guard 61 for the trigger 58. The forward end of the main frame 50 is provided with two upwardly extending lugs 62 forming a guideway or a saddle, and on the sides of the said lugs are formed half-round pivots 63 adapted to be engaged by correspondingly-shaped notches 64 formed in the sides 65 of the barrel receiver 52 (see Figs. 15 and 16). By the arrangement described the barrel receiver is mounted to swing on the pivot 63 into and out of position on the main frame 50 when assembling or disassembling the firearm, as hereinafter more fully explained. The sides 65 fit snugly over the sides of the main frame 50 so as to hold the parts mounted on the main frame against accidental displacement. The barrel receiver 52 is provided on top with a saddle 70 provided with spaced segmental grooves 71 engaged by correspondingly shaped lugs or ribs 72 formed on the under side of the rear end of the barrel 51 to hold the latter in position on the barrel receiver 52. The rear end of the saddle 70 and the rear end of the barrel 51 abut against the forward face of a lug 75 which is an integral part of the main frame 50, and the back of this lug 75 is beveled to guide a cartridge 76 into the bore 77 of the barrel 51, as hereinafter more fully explained. The top of the lug 75 is provided with a half-round recess 78 having an upwardly and forwardly inclined bottom leading to the inclined bottom 79 at the rear end of the bore 77 of the barrel 51 to insure proper seating of the cartridge 76 in the rear end of the barrel.

The breech block 53 is provided with the usual forwardly extending cover 80 for the barrel 51 and with the recess 82 at the rear end for receiving the upper portion of the hammer 56. The sides 83 of the breech block 53 are provided at the inner faces with longitudinally extending grooves 84 mounted to slide on guideways, of which portions 85 and 86 are spaced apart and formed on the barrel receiver 52 (see Fig. 15), other portions 87 are formed on a lug 88 forming an integral part of the main frame 50 (see Fig. 16), and still other portions 89 of the guideways are formed on the back strap 59 (see Fig. 17). The lug 88 of the main frame 50 fits into the space between the spaced guideway portions 85 and 86 of the barrel receiver 52. It will be noticed that by the arrangement described a continuous guideway is formed which, however, is partly on the barrel receiver 52, partly on the main frame 50, and partly on the back strap 59, and hence the breech block 53 is securely held against upward movement by the upward pressure of the uppermost cartridge 76 in the magazine 54 at the same time the barrel receiver 52 and the back strap 59 are locked to the main frame 50. In order to strengthen the barrel receiver 52 the sides 65 thereof are rigidly connected with each of the guideway portions 86 by an integral crossbar 66 to stiffen the barrel receiver. The crossbar 66 is adapted to abut against the back of the lug 88 thus holding the barrel receiver 52 against accidental forward movement.

The breech block 53 is pressed on by a spring 90 extending with its forward end into a chamber 91 forming an integral part of the breech block at the bottom of the forward end, and this chamber 91 fits into the guideway formed by the lugs 62. The rear portion of the spring 90 is coiled around the pin 92 seated in a recess 93 formed in the saddle 70 of the barrel receiver 52. It is understood that the forward movement of the breech block 53 is limited by its forward shoulder abutting against the rear end of the barrel 51, as plainly shown in Figs. 4, 5 and 6.

The firing pin 55 is mounted to slide in the breech block 53 and is arranged for center firing the cartridge 76 in the barrel 51 at the time. The firing pin 55 is of any approved construction and is preferably of the sectional type illustrated in Figs. 4, 5 and 6, and comprises a front firing pin 100 pressed on by a spring 101, and a rear firing pin 102 engaged by a lock pin 103 to limit the sliding movement of the firing pin 55.

The hammer 56 is mounted to swing on a pivot 105 held in the rear portion of the main frame 50, and the said hammer is adapted to actuate the firing pin 55 in the usual manner. The heel 106 of the hammer 56 is provided with the usual shoulder 111 adapted to engage a tooth or lug 112 formed on the rear end of the sear 57 to hold the hammer 56 in cocked position, as shown in Figs. 4, 5 and 10. The sear 57 is practically the same as the one shown and described in the Letters Patent above referred to so that further detail description of the same is not deemed necessary, it being understood, however, that the forward end of the sear 57 is pressed on by a spring 113 to normally hold the sear 57 in rearmost position to engage the hammer 56 to hold the same in cocked position. The spring 113 is mounted on a pin 114 provided with a head 115 having a transverse knife edge 116 bearing on the front wall of a slot 117 formed in the main frame 50. The knife edge 116 allows a free up and down rocking movement of the sear 57. Into the rear end of the slot 117 opens a groove 118 formed in the left-hand side of the main frame 50 to accommodate the sear 57, and the rear end of this groove 118 terminates in a bearing 119 engaged by the rounded-off tooth 112 which thus forms a pivot for the sear to rock on up and down, and also to allow the forward and rearward movement of the said sear. The sear 57 is provided near its forward end with a square shoulder 120 adapted to be engaged by a projection 121 formed on the trigger 58 fulcrumed at 122 in the main frame 50. The finger-piece of the trigger 58 extends into the trigger guard 61 to be within convenient position for the operator's finger for pressing the trigger whenever it is desired to move the sear 57 forward against the tension of the spring 113 to release the hammer 56 for firing purposes. A spring 123 is mounted in the main frame 50 and engages the top of the trigger 58 to hold the latter normally in a rearmost position.

The rear ends of the sides 65 of the barrel receiver 52 are locked in place by the back strap 59 fitting into a recess in the back of the handle 60 of the main frame 50. The lower end of the back strap 59 is pivoted at 130 to the handle 60 and the upper end of the back strap 59 is provided with forwardly extending lugs 131 (see Figs. 1, 12 and 17) fitting the sides of the main frame 50 and terminating in catches 132 engaging shoulders 133 formed on the rear edges of the sides 65 of the barrel receiver 52, thus holding the barrel receiver locked in position at its rear end. The back strap 59 is provided with a recess 135 in which is arranged a hammer spring 136 pressing with its upper end on the under side of the plunger or head 137 mounted to slide in the recess 135. The top of the plunger 137 is pivotally connected at 138 with a link 139 engaging at its upper end a recess 140 formed in the under side of the heel 106 of the hammer 56 to impart a forward swinging movement to the hammer when the latter is released by the sear 57. It is understood that when the hammer 56 swings forward it engages the firing pin 55 and moves the same forward to fire a cartridge 76 held in the rear end of the bore of the barrel 51, as previously mentioned. The bottoms of the lugs 131 of the back strap 59 normally rest on lugs 141 formed integrally with the sides of the main frame 50, as plainly indicated in the drawings. The lower end of the hammer spring 136 bears on an arm 145 projecting at an angle from a catch 146 provided with trunnions 147 mounted to turn in the back strap 59. The catch 146 extends downward through the handle 60, and its lower end is provided with a plate 148 adapted to engage the under side of the bottom 149 of the magazine 54 removably held in the handle 60. By the arrangement described the hammer spring 136 controls the hammer 56, the catch 146 and the back strap 59 owing to the fact that the catch 146 is pivoted on the back strap, as will be readily understood by reference to Fig. 4.

In order to effectively lock the firearm, use is made of a safety device capable of rendering the hammer 56 and the trigger 58 inoperative, at the same time locking the breech block 53 against movement. For the purpose mentioned use is made of a safety lever 160 arranged on the left-hand side at the rear end of the firearm and provided with a pivot 161 mounted to turn in a bearing 162 formed in the back strap 59. The inner end of the pivot 161 terminates in a cam 163 and adapted to engage a cam 164 formed on the hammer 56 to lock the latter when in cocked position, and at the time the safety lever 160 is swung upward from its normal lowermost position (indicated in dotted lines in Figs. 1 and 10) to uppermost position (shown in full lines in Fig. 1 and in dotted lines in Figs. 9 and 12). It is understood that when the safety lever 160 is in lowermost or "off" position then the cams 163 and 164 are in unlocked position (see Fig. 10) to allow free movement of the hammer from cocked firing position and vice versa. When the hammer is in cocked position and the lever 160 is swung upward then the cams 163 and 164 interlock (see Fig. 9) to hold the hammer 56 against swinging forward into firing position.

In order to render the trigger 58 inoperative at the time the hammer 56 is locked in cocked position by the safety device, the following arrangement is made: On the under side of the pivot 161 are formed rack teeth 170 in mesh with the teeth 171 of a rack bar 172 extending forwardly and mounted to slide in a bearing 173 formed in the left-hand rear portion of the main frame 50. The forward end of the rack bar 172 is provided with a bevel 174 adapted to engage the rounded-off top of one side of a U-shaped controlling safety piece 175 mounted to slide up and down on a bearing 176 formed on the main frame 50 (see Fig. 16), and this controlling safety piece 175 is seated on the top of the forward portion of the sear 57. When the safety lever 160 is in lowermost position the rack bar 172 is in rearward retracted position and hence does not affect the working of the controlling safety piece 175 to allow the latter to function the same as described in the Letters Patent above referred to. When the safety lever 160 is swung into uppermost position the rack bar 172 is moved forwardly by the action of the meshing rack teeth 170 and 171 and hence the beveled end 174 engages the controlling safety piece 175 and bears the same downward thus moving the sear 57 downward at its forward end thereby moving the shoulder 120 out of the path of the projection 121 of the trigger 58 thus rendering the latter inoperative relative to the sear (see Fig. 4). It will be noticed that should the hammer safety fail for any cause whatever, the trigger safety, controlled by the same safety lever 160, renders the trigger and hence the firearm inoperative for firing.

In order to hold the breech block 53 locked against sliding movement at the time the safety lever 160 is in uppermost position, the following arrangement is made: The pivot 161 is provided adjacent the lever 160 with a cut-out portion or notch 180, the bottom of which is flush with the under side of the left-hand side 83 of the breech block 53, and this side 83 is provided with a cut-out portion 181 in register with the pivot 161 and engaged by the latter at the time the safety lever 160 is swung into an uppermost position, as shown in Fig. 12. It will be noticed that by the portion of the pivot 161 engaging the cut-out portion or notch 181 the breech block 53 is locked against rearward movement. A second notch 182 is formed on the left-hand side 83 of the breech block 50 a distance forward of the notch 181, and this notch is adapted to be engaged by the pivot 161 at the time the breech block 53 is pushed into rearmost position by hand and the safety lever 160 is swung upward to hold the breech block 53 locked in rearmost position.

As the hammer 56 is concealed in the recess 82 the user cannot see the position of the hammer, that is, whether the same is in cocked position or in forward or firing position. When the safety lever 160 is in lowermost position and cannot be pushed up by the user then the hammer 56 is in forward or firing position and not in cocked position. In order to accomplish this result the following arrangement is made: The rack bar 172 is provided at its inner side with a lug 190 adapted to register with a segmental groove 191 formed on the left-hand side of the hammer 56, and this groove terminates at its forward end in an angular groove 192 which extends horizontally at the time the hammer 56 is in cocked position to allow the lug 190 to move from the inner end of the groove 191 into and along the groove 192 at the time the rack bar 172 is moved forward on swinging the safety lever 160 from lowermost into uppermost position, as previously explained (see Figs. 9 and 10). When the hammer 56 is in the firing position, shown in Fig. 6, then the lug 190 abuts against the back of the heel 106 of the hammer 56 and consequently the safety lever 160 cannot be swung upward from the lowermost or "off" position into uppermost or "on"

position and hence the user knows that the hammer 56 is in fired position and not in cocked position. It is understood that when the safety lever 160 is "off" and the hammer 56 is cocked, as indicated in Fig. 10, then the lug 190 is at the upper end of the groove 191 and as the latter is a segmental one the hammer 56 can readily swing forward for firing the gun whenever the trigger 58 is pulled. When, however, the hammer 56 is in cocked position and the safety lever 160 is swung upward and the rack bar 172 is moved forward then the lug 190 moves along into the groove 192 thus forming a lock for the hammer to prevent the same from accidentally swinging out of cocked position into firing position, as will be readily understood by reference to Fig. 9. By the arrangement described, a supplementary locking device for the hammer is provided and at the same time the user of the firearm knows what position the hammer 56 is in at the time.

A grip safety is provided for holding the sear 57 in inoperative position relative to the trigger 58 unless the grip safety is pressed by the palm of the hand having hold of the handle 60. This grip safety is in the form of a lever 200 having a pivot 201 engaging an open bearing 202 formed on the rear end of the main frame 50 (see Fig. 16), and the lever 200 is provided with a rib 203 engaging a slot 204 formed in the back strap 59. A spring 205 is mounted on the handle 60 and presses the lever 200 to normally hold the latter in rearmost position, as plainly shown in Figs. 1, 2, 3 and 12. The lever 200 is provided with a forwardly extending arm 206 extending through a notch 207 formed in the tooth or pivot 112 of the sear 57 (see Fig. 22), and the arm 206 terminates in a downwardly extending hook 208 normally engaging the forward face of the tooth or pivot 112 (see Fig. 12) to hold the sear 57 against forward movement on pressing the trigger 58. When the user takes hold of the handle 60 the lever 200 is pressed forward whereby the hook 208 is lifted out of engagement with the tooth 112 to allow the sear 57 to be moved forward on pressing the trigger 58. The position of the grip safety indicates the position of the hammer. When the hammer is down the rounded portion 111 of the hammer stays the sear 57 so far forward as to prevent the hook 208 from dropping below the bottom of the notch 207 of the sear 57. The result is that the handle portion of the lever 200 is not exposed when the hammer is down.

The magazine 54 is removably held in the handle 60 and is preferably of the construction shown and described in the patents above referred to so that further description of the same is not deemed necessary, it being sufficient to state that the magazine 54 is provided with the usual spring-pressed plunger (not shown) for pressing the cartridges upward against the under side of the breech block 53 to be successively pushed into the bore of the barrel 51 during the return movement of the breech block. In case the last cartridge has been pushed into the barrel 51 and the magazine 54 is removed for refilling then the sear 57 is moved automatically into inoperative position to prevent accidental firing of the firearm while the last cartridge is in position in the barrel. For the purpose mentioned use is made of a flat spring 210 held in a recess 211 formed in the left-hand side of the main frame 50, and the free end of this spring 210 terminates in a head 212 bearing on the sear 57 and provided at one side with a lug 213 (see Fig. 4ᵃ) adapted to be engaged by the upper forward edge of the magazine 54 at the time the latter is moved into final position in the handle 60 to swing the spring 210 upward with a view to move the head 212 out of engagement with the sear 57. Now when the magazine 54 is removed from the handle 60 then the spring 210 by its resiliency swings downward and its head 212 engages the sear 57 and swings the same downward into inoperative position relative to the trigger 58.

In hand firearms of the hammer type, illustrated in Figs. 23 to 27, inclusive, the main frame 50, the barrel 51, the barrel receiver 52, the magazine 54, the sear 57 and the trigger 58 are the same as above described relative to the hammerless hand firearm shown in Figs. 1 and 4 to 22, inclusive, so that further description of these parts is not deemed necessary. In this type of hand firearm the safety devices above described (except the grip safety) are dispensed with. The hammer 250 is mounted to swing on the pivot 105 and is provided with a fingerpiece 251 to permit the user to move the hammer 250 by hand in cocked position, in which it is held by the sear 57 until the latter is actuated by the trigger 58. When this takes place the hammer 250 is released and swings forward by the action of its spring 136 to strike the firing pin 55 and thereby fire the cartridge 76 held in the barrel 51 at the time. The breech block 255 for this firearm is practically the same as the breech block 53 except that the rear end 256 is shortened and open. The back strap 260 is similar to the back strap 59 but is slotted at the top for the passage of the upper end of the hammer 250 and its fingerpiece 251. The back strap 260 is practically the same as the one shown and described in the Letters Patent of the United States, No. 1,311,715, above referred to, and hence further description of the same is not deemed necessary except to state that the outer faces of the lugs 131 are roughened to permit of conveniently pulling the back strap 260 rearwardly for disengaging the catches 132 from the shoulders 133 when it is desired to remove the barrel receiver 52 when disassembling the firearm. The sear controlling piece 175 is engaged on the top of its right-hand lug by a slide 265 mounted to slide up and down in a bearing 266 formed in the barrel receiver 52, and the upper end of this slide 265 is adapted to engage a notch 267 formed in the right-hand side of the breech block 255. This construction is used on firearms of both the hammer and hammerless type. When the breech block 255 moves into recoil position it imparts a downward sliding movement to the slide 265 which in turn moves the sear controlling piece 175 downward thus moving the sear 57 into inactive position, and when the breech block 255 returns to normal position the slide 265 reëngages the notch 267. The slide 265 is held against dropping out of position by a retaining pin 268, as plainly shown in Fig. 26. The slide 265 forms an extension member of the sear controlling piece 175 to allow of conveniently placing the latter in position on the frame 50.

In order to render each of the firearms herein disclosed exceedingly sensitive use is made of an adjusting screw 270 (see Fig. 24) screwing in the right-hand side of the main frame 50 and engaging with its inner end the back of the tooth 112 of the sear 57. By this arrangement the tooth 112 can be readily adjusted relative to the shoulder 111 to render the firearm exceedingly sensitive, that is, requiring very little pull on the part of the user on the trigger 58 to actuate the sear 57 with a view to release the hammer 250 when it is desired to fire the cartridge in the barrel 51. The breech block 255 is provided with a spring-pressed pivoted extractor 275 of usual construction for extracting the empty shell from the barrel and discharging it through the discharging opening 276 in the right side 83 of the breech block 255 (see Fig. 24). This construction is also used on the breech block 53.

In the automatic hand firearm for target practice, illustrated in Figs. 28 to 39, the main frame 50, the sear 57 and the trigger 58 are the same as above described relative to the other two types or firearms, and the hammer 250 is the same as the one used in the firearm illustrated in Figs. 23 to 27, so that further description of these parts is not deemed necessary. The barrel receiver 300, the barrel 301 and the breech block 302 are practically, in this case, of the construction shown and described in the Letters Patent of the United States, No. 1,311,715, above referred to, and hence further description of the same is not deemed necessary. The barrel receiver 300 is provided at the rear end with a stiffening crossbar 305 similar to the crossbar 66 of the barrel receiver 52 and adapted to engage the back of the lug 87 of the main frame 50 to hold the barrel receiver against accidental forward movement. It is understood that the barrel 301 is removably mounted in the barrel receiver 300 and the latter is removably mounted on the main frame 50 and the recoil actuated breech block 302 is mounted to slide on the barrel receiver 300.

For this type of hand firearm the extractor mechanism is of special construction and is more fully shown in Figs. 32, 33, 34 and 35. The extractor 310 is provided at its forward end with a hook 311 adapted to engage the rim 312 of the cartridge 313 contained in the barrel 301 at the time, and the rear end of the extractor 310 is provided with an inwardly extending combined lug and pivot 315 engaging a recess 316 formed in the inner wall of a recess 317 arranged in the right-hand side of the breech block 302. Into this recess 317 fits a plate 320 provided with a recess 321 in which is slidably mounted a combined lock and follower pin 322 pressed forwardly by a spring 323 arranged in the recess 321. The follower pin 322 bears against the rear end of the extractor 310 adjacent the pivot 315 so as to engage the hook 311 with the rim 312 of the cartridge 313. The follower pin 322 is provided with a locking extension 325 adapted to snap under the forward wall 326 of the recess 317 to lock the plate 320 in position in the recess 317, as plainly indicated in Fig. 32. The plate 320 is preferably made of brass or other non-corrosive metal not liable to be attacked by the gases incident to the firing of the cartridge 313 in the barrel 301. When it is desired to remove the extractor from the breech block 302, a tool is inserted in the forward end of the recess 317 to push the pin 322 rearward until its locking extension 325 clears the wall 326 to allow of taking the plate 320 out of the recess 317. After this has been done, the extractor 310 can be lifted out of the recess 317. The rear end of the plate 320 is provided with a rabbet 327 engaged by a shoulder 328 formed on the back wall of the recess 317 to assist in holding the plate 320 in position in the recess 317.

The firing pin 330 is practically the same as the one described in the Letters Patent of the United States, No. 1,311,715 above referred to, and is adapted to fire the cartridge 313 at the rim (see Fig. 28). The retaining pin 331 for this firing pin 330 is placed in a bore 332, formed transversely in the breech block 302, from the recess 317, and hence this retaining pin 331 cannot be removed from the breech block 302 until the plate 320 is first removed from the breech block, as above described. The bore 332 connects with a smaller bore 333 leading to the left-hand side of the breech block to permit of inserting a small tool for pushing out the retaining pin 331 whenever it is desired to remove the same by way of the recess 317 after the plate 320 has been removed.

The types of firearm shown in Figs. 1 and 2 are provided with the usual front and rear sights 350 and 351 mounted on the recoil actuated breech block 53, and the firearm illustrated in Figs. 3 and 28 is provided with front and rear sights 352 and 353, of which the front sight 352 is mounted on the front end of the barrel and the rear sight 353 is mounted on the breech block 302. The rear sight 353 is an open sight and associated with it is a peep sight 355 in the form of a plate having an opening 356 adapted to register with the usual notch 357 in the fixed sight 353. The peep sight 355 is provided with a pivot 360 mounted to turn in a bearing 361 arranged on the breech block 302 adjacent the base of the rear open sight 353. A slot 362 leads into the top of the bearing 361 and through this slot 362 extends the base of the peep sight 355, as plainly shown in Fig. 37. The inner end of the pivot 360 is provided with a coupling member 363 engaging a coupling member 364 formed in a pivot 365 mounted to turn in the bearing 361 and turning with the pivot 360 whenever the peep sight 355 is swung from horizontal inactive position, shown in dotted lines in Fig. 36, into vertical active position, as illustrated in Figs. 3, 28, 31, 36 and 37. The pivot 365 is provided with a reduced portion 366 extending into an opening 367 formed in the right-hand end wall of the bearing 361, as plainly shown in Fig. 37. A spring 368 is coiled on the reduced portion 366 and serves to press the pivot 365 and consequently the pivot 360 toward the left to hold the peep sight 355 in engagement with the left-hand wall of the slot 362, thus accurately locating the axis of the peep sight relative to the axis of the barrel and the outer sight 350 or 352. It will also be noticed that the arrangement prevents accidental turning of the peep sight 355 when the latter is in horizontal inactive, or in vertical active position. The pivots 360 and 365 have their axes coinciding, and the inner end of the coupling member 363 is preferably provided with a centrally arranged pin 370 engaging a central opening 371 formed in the pivot 365 to hold the pivots 360 and 365 in axial alinement. In order to place this peep sight in position in the bearing 361, the pivot 365 with its spring 368 is first placed in the bearing 361 through the open end and then the pivot 360 of the peep sight 355, held in tilted position, is passed through the slot 362 in engagement with the pivot 365 to push the latter to the right against the tension of its spring 368 until the left-hand end of the pivot 360 clears the left-hand end of the slot 362 to allow of passing the pivot 360 in position in the bearing 361. The peep sight 355 is now released to allow the spring 368 to push the pivot 365 and with it the pivot 360 into the position shown in Fig. 37 with the peep sight 355 in contact with the left-hand wall of the slot 362. It is understood that the peep sight 355 is provided with a sectional pivot formed of the pivots 360 and 365 to allow of readily installing peep sights of different radii or form to suit individual taste or the requirements of the user's eyesight. Thus a peep sight 355 of one type can be readily exchanged for another one without removing the coupling pivot 365 from the bearing 361.

In order to hold the peep sight 355 firmly in raised or lowered position, use is made of a holding pin 375 mounted to slide in a recess 376 inclined downwardly and forwardly in the top portion of the breech block 302. In this recess 376 is held a spring 377 pressing against the holding pin 375 to push the latter upwardly and rearwardly against either of the two flattened portions 378 and 379 formed on the pivot 365 to hold the latter against accidental turning in its bearing 361. It is understood that when the peep sight 355 is in vertical position, the holding pin 375 engages the flattened portion 379 and when the peep sight 355 is swung downward into horizontal position then the holding pin 375 engages the forward portion 378. It is understood that when the peep sight 355 is in lowered position it is below the notch 357 of the sight 353 and hence the latter is used in conjunction with the front sight 352.

Having thus described my invention, I claim as new and desire to secure by Letters Patent:—

1. As an article of manufacture, a composite automatic hand firearm, comprising a single main frame provided with a magazine-receiving portion and having permanently associated with it an actuating mechanism, a plurality of barrels, barrel receivers, breech blocks and magazines, the said main frame, barrels, barrel receivers, breech blocks and magazines being of different types and so constructed to permit an interchangeable assembling of the said barrels, barrel receivers, breech blocks and magazines in sets, with the said single main frame and its actuating mechanism, to form a number of different hand firearms for diverse uses.

2. As an article of manufacture, a composite automatic hand firearm, comprising a single main frame provided with a magazine receiving portion and having associated therewith an actuating mechanism including a hammer, sear and trigger mechanism, a plurality of barrels of different types, a plurality of barrel receivers of different types each carrying one of the said barrels and each adapted to engage the said main frame detachably, breech blocks of different types each adapted to be slidingly associated with the said main frame and adapted to coact with the corresponding barrel receiver, the said actuating mechanism and magazines of different types each adapted to detachably fit into the said magazine receiving portion of the main frame.

3. As an article of manufacture, a composite automatic hand firearm, comprising a single main frame provided with a magazine receiving portion and having associated therewith an actuating mechanism including interchangeable hammers, a sear and a trigger mechanism, a plurality of different caliber barrels, a plurality of barrel receivers of different types each provided with means for detachable engagement by a corresponding barrel, each barrel receiver being adapted to be detachably secured in place on the said main frame, breech blocks of different types each adapted to be slidingly engaged with the said main frame and adapted to coact with the corresponding barrel receiver and the selected hammer of the said actuating mechanism, and magazines of different types each adapted to detachably fit into the said magazine receiving portion of the main frame.

4. In an automatic hand firearm, a main frame, a barrel receiver, a back strap and a breech block, the said main frame back strap and barrel receiver having a continuous guideway and the said breech block being mounted to slide on the said guideway.

5. In an automatic hand firearm, a main frame provided with an integral lug having a guideway, a barrel receiver having spaced guideways between which fits the said lug, the guideway of the lug being in alinement with the spaced guideways on the said barrel receiver, and a breech block mounted to slide on the said alined guideways.

6. In an automatic hand firearm, a main frame provided with an integral lug having a guideway, a barrel receiver having spaced guideways between which fits the said lug, the guideways of the lug being in alinement with the spaced guideways on the said barrel receiver, a back strap held on the frame and having a guideway in alinement with the said guideways on the frame and barrel receiver, and a breech block mounted to slide on the said alined guideways of the main frame, barrel receiver and back strap.

7. In an automatic hand firearm, a main frame provided with a lug having guideway portions, a barrel receiver having spaced guideway portions and between which extends the said frame lug, a back strap held on the main frame and provided with guideway portions, the said second guideway portions being in alinement and forming a guideway, and a breech block provided with grooves slidingly engaging the said guideway.

WALDO E. ROSEBUSH.